Sept. 9, 1969 L. A. DAVIS 3,466,406

TELEPHONE HANDSET SUPPORT

Filed Nov. 8, 1966

INVENTOR
LIONEL ARCHIBALD DAVIS

BY Browne, Schuyler & Beveridge

ATTORNEYS

United States Patent Office 3,466,406

Patented Sept. 9, 1969

3,466,406

TELEPHONE HANDSET SUPPORT

Lionel A. Davis, 5 Arilla Road, Pymble, New South Wales, Australia

Filed Nov. 8, 1966, Ser. No. 592,777
Claims priority, application Australia, July 8, 1966, 8,045/66
Int. Cl. H04m *1/05*
U.S. Cl. 179—157 9 Claims

ABSTRACT OF THE DISCLOSURE

A handset shoulder support is disclosed which uses a spring clip snapped over the open end of the support to hold it tightly on the handset.

This invention relates to a new and improved telephone handset support of the type which is attached to the telephone handset for supporting the handset on the shoulder during use.

On of the objects of the present invention is to provide an improved handset support which may be readily installed on or removed from a telephone handset.

A further object is to provide a telephone handset support which may be firmly secured to a handset against movement and will not interfere with placement of the handset on the telephone cradle or prevent depression of the underlying telephone contact buttons.

A further object of the present invention is to provide such a telephone handset support with a durable construction that may be mass-produced at relatively low cost.

Other objects and advantages of the present invention will be apparent from the following detailed description in the accompanying drawings in which.

Figure 1:
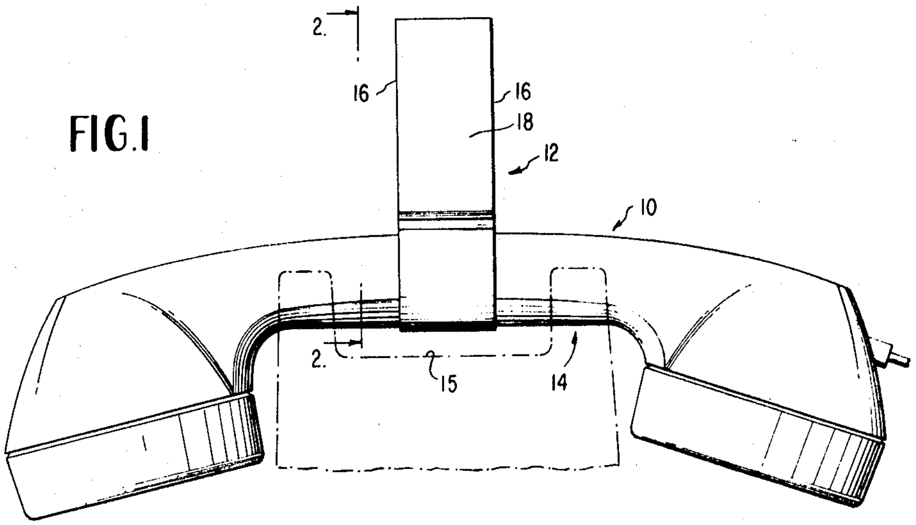
FIGURE 1 is a side view of a telephone handset with an attached support embodying the present invention and with a portion of the telephone cradle shown in phantom.

Referring to the drawings in detail, there is shown for illustrative purposes only, a typical telephone handset generally designated 10 having an attached support generally designated 12, embodying the present invention, the handset being mounted in idle position on a typical cradle 14 of a dial telephone.

Figure 2:
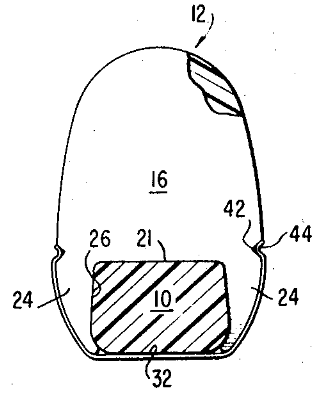
FIGURE 2 is a cross-sectional view taken generally along lines 2—2 of FIGURE 1.
Figure 3:
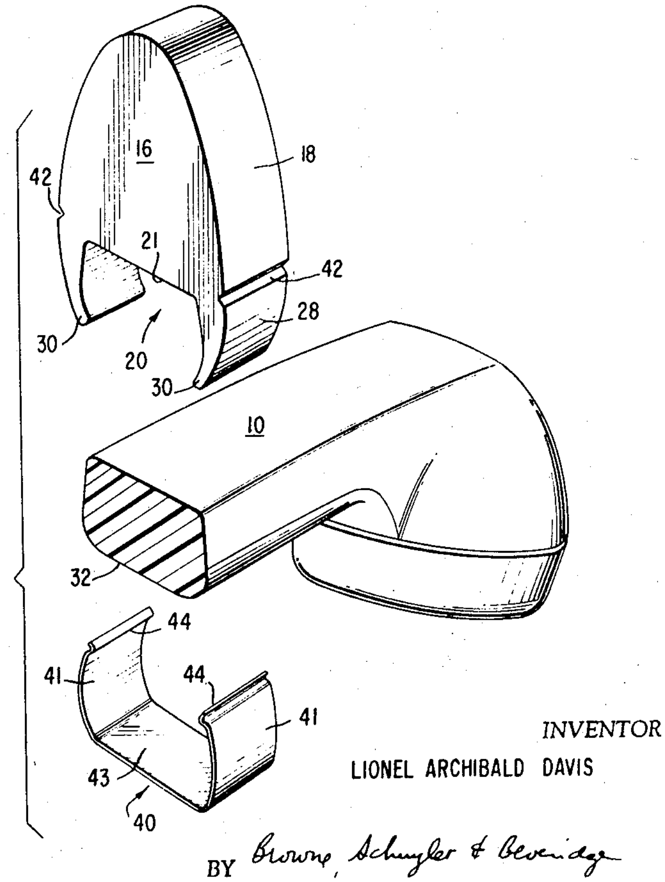
FIGURE 3 is an exploded perspective view of the handset support with a portion of the handset broken away.

In the illustrated form of the invention, support 12 has a generally pear-shaped body molded from rubber, polyvinylchloride or similar resilient deformable material with opposite parallel planar faces 16 separated by a peripheral side wall 18 which is linear in the transverse direction thereof. For receiving the shank of handrest 10, one end of the support body has a generally U-shaped opening 20 dimensioned to fully receive the handset as shown in FIGURE 2. The shape of opening 20 substantially corresponds to the shape of the handset shank and accordingly may be varied in conformity to other handset shapes (not shown). Opening 20 is defined by clamping jaws 24 the outer and inner peripheral walls of which are formed by surfaces 26, 28 converging generally at the jaw extremities 30 which are thus narrow in cross section. Additionally jaws 24 are of a length generally equal to the corresponding side wall dimension of the handset. In this manner the lower surface 32 of the handset will lie substantially flush or coplanar with jaw extremities 30 when assembled. Thus when the handset is placed on the telephone cradle 14, the jaws will be spaced from telephone portion 15 as shown in FIGURE 1 to allow depression of the contact buttons (not shown). While this problem may not be significant with respect to the illustrated telephone cradle which is amply spaced above surface 15, the problem is definitely present in telephone sets wherein the handset lies substantially flush on the surface from which the contact buttons project. Such telephones are in use in Great Britain and other foreign countries.

In order to firmly retain support 12 on handset 10 there is provided a clip generally designated 40 adapted to fit on body 10 across opening 20 and handset surface 32. Preferably, clip 40 is formed from sheet steel of approximately $\frac{1}{32}$ to $\frac{3}{64}$ inch in gauge and with a C-shaped configuration including arm portions 41 conforming to the arcuate contour of peripheral side wall portions 28 of jaws 24 and a cross piece 43 conforming to the contour of handset surface 32. Additionally the width of clip 40 in the preferred embodiment is about ½ inch which is less than the transverse dimension of peripheral side wall 18 of the support body; the latter dimension being about ¾ inch. This allows latitude in applying the clip to the support body.

To retain clip 40 on support body 12, the latter is provided in its opposite side wall portions with grooves 42 extending transversely fully between faces 16 of the support body. Formed on opposite extremities of clip 40 are integral projections 44 extending inwardly for lodging in retaining grooves 42 with a snap fit to thereby firmly secure clip 40 on the support. In the preferred embodiment clip 40 is dimensioned across its opposite arm portions 41 less than the corresponding dimension of the support body so as to exert a force on jaws 44 deflecting them inwardly into firm engagement with the handset support. Additionally grooves 42 are preferably formed generally at the same level as the back wall 21 of opening 20.

Assembly of support 12 on handset 10 is effected by placing the handset shank in the opening and then applying clip 40 over opening 20. Clip 30 is then pressed along side wall portions 28 until projections 44 engage in grooves 42. This assembly is facilitated by the outward curvature of jaw surfaces from their extremities 30 which curvature enables surfaces 28 to be cammed inwardly by clip projections 44 as the clip is assembled. Once assembled, the clip itself because of its slight gauge will also not project downwardly sufficiently to prevent depression of the contact buttons when the handset is seated on the cradle.

It will thus be seen that the present invention provides a telephone handset support which may be economically manufactured and easily applied to a telephone handset where it will be positively fixed against movement and will not interfere with placement of the telephone on the underlying telephone cardle. It will also be appreciated that the clip of the present invention obviates additional fasteners such as screws heretofore employed in conventional handset supports.

Modifications and adaptations of the present invention readily apparent from the foregoing description and associated drawings, although not specifically mentioned herein, will nevertheless be included within the scoop of the present invention as indicated in the appended claims.

I claim:

1. A telephone handset support comprising a resilient deformable body having a pair of clamping jaws in one end defining an opening dimensioned to receive the shank of a telephone handset, said body having a peripheral side wall and a pair of grooves formed transveresly in opposite portions of said side wall adjacent said one end, and a thin clip having inwardly extending integral projections at the opposite ends thereof, said clip being dimensioned and shaped to be placed on the body across said opening with its end projections respectively retained in said grooves to thereby maintain said clamping jaws against a handset portion received therein and prevent displacement of said support body relative to the handset.

2. The telephone handset support defined in claim 1 wherein said clip is genaerlly C-shaped and wherein the side wall portions of the body at the outer periphery of said jaws are curved similarly to the corresponding portions of the clip which are engageable therewith.

3. The telephone handset support defined in claim 2 wherein said jaws and said clip are dimensioned such that when assembled on a handset the clip imposes an inward force on said jaws to firmly clamp the body on the handset.

4. The telephone handset support defined in claim 3 wherein the groove are positioned generally at the same level as the back wall of said opening.

5. A handset support defined in claim 4 wherein said side wall portions at the periphery of said jaws are curved from the extremity of the jaws outwardly to said grooves and wherein the distance between said projections on said clip is less than the maximum distance across said side wall portions such that the latter are cammed by said projections during assembly to facilitate placement of the clip on the body.

6. The telephone handset support defined in claim 5 wherein said clamping jaws terminate in relatively narrow portions defined by said outer peripheral wall portions and inner peripheral wall portions defining said openings, said inner and outer peripheral surfaces converging at the extremities of said jaws such that the bottom surface of the telephone handset when received in said support body will lie substantially coplanar with the extremities of said jaws.

7. The telephone handset support as defined in claim 6 wherein said outer peripheral side wall of said body has a generally linear transverse dimension, said grooves extend fully across said side wall, and said clip including said projections has a width slightly less than the transverse dimension of said body side wall.

8. The telephone handset support defined in claim 7 wherein said clip has a thickness of approximately one-thirty second of an inch such that it will not interfere with placement of the handset on an associated telephone cradle or the like.

9. The telephone handset support defined in claim 8 wherein said clip is made from sheet steel and said body from polyvinylchloride.

References Cited

UNITED STATES PATENTS

| | | | |
|---|---|---|---|
| 2,647,171 | 7/1953 | Harmon | 179—157 |
| 2,745,906 | 5/1956 | Bolton | 179—157 |

WILLIAM C. COOPER, Primary Examiner